US006990436B1

(12) United States Patent
Huang

(10) Patent No.: US 6,990,436 B1
(45) Date of Patent: Jan. 24, 2006

(54) COMPUTING FREQUENCY BY USING GENERALIZED ZERO-CROSSING APPLIED TO INTRINSIC MODE FUNCTIONS

(75) Inventor: Norden E. Huang, Bethesda, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/729,579

(22) Filed: Nov. 28, 2003

(51) Int. Cl.
G06F 15/00 (2006.01)
(52) U.S. Cl. ............................ 702/199; 702/75; 702/76
(58) Field of Classification Search .................... 702/3, 702/4, 15–17, 75–78, 106, 124, 126, 189–191, 702/193–199; 708/300, 303, 304, 317, 320
See application file for complete search history.

(56) References Cited

U.S. PATENT DOCUMENTS

| | | | |
|---|---|---|---|
| 3,994,284 A | 11/1976 | Voelker | |
| 5,105,275 A | 4/1992 | Iizuka et al. | |
| 5,119,432 A | 6/1992 | Hirsch | |
| 5,520,052 A * | 5/1996 | Pechersky | 73/579 |
| 5,568,206 A | 10/1996 | Goeckler | |
| 5,893,054 A * | 4/1999 | White | 702/189 |
| 5,983,162 A * | 11/1999 | Huang | 702/4 |
| 6,130,071 A * | 10/2000 | Alitalo et al. | 435/69.4 |
| 6,131,071 A * | 10/2000 | Partyka et al. | 702/16 |
| 6,192,758 B1 * | 2/2001 | Huang | 73/579 |
| 6,301,967 B1 * | 10/2001 | Donskoy et al. | 73/579 |
| 6,311,130 B1 * | 10/2001 | Huang | 702/2 |
| 6,314,813 B1 * | 11/2001 | Uhlig | 73/664 |
| 6,347,542 B1 * | 2/2002 | Larsson et al. | 73/12.12 |
| 6,381,559 B1 * | 4/2002 | Huang | 702/194 |
| 6,507,798 B1 * | 1/2003 | Salvino et al. | 702/75 |
| 6,631,325 B1 * | 10/2003 | Huang et al. | 702/3 |
| 6,738,734 B1 * | 5/2004 | Huang | 702/194 |
| 2003/0033094 A1 * | 2/2003 | Huang | 702/39 |

* cited by examiner

Primary Examiner—Carol S. W. Tsai
(74) Attorney, Agent, or Firm—Keith L. Dixon

(57) ABSTRACT

This invention presents a method for computing Instantaneous Frequency by applying Empirical Mode Decomposition to a signal and using Generalized Zero-Crossing (GZC) and Extrema Sifting. The GZC approach is the most direct, local, and also the most accurate in the mean. Furthermore, this approach will also give a statistical measure of the scattering of the frequency value. For most practical applications, this mean frequency localized down to quarter of a wave period is already a well-accepted result. As this method physically measures the period, or part of it, the values obtained can serve as the best local mean over the period to which it applies. Through Extrema Sifting, instead of the cubic spline fitting, this invention constructs the upper envelope and the lower envelope by connecting local maxima points and local minima points of the signal with straight lines, respectively, when extracting a collection of Intrinsic Mode Functions (IMFs) from a signal under consideration.

14 Claims, 7 Drawing Sheets

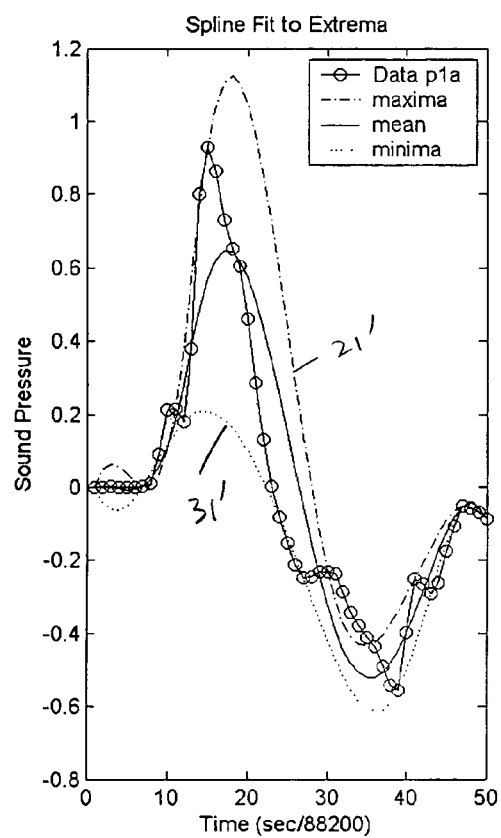
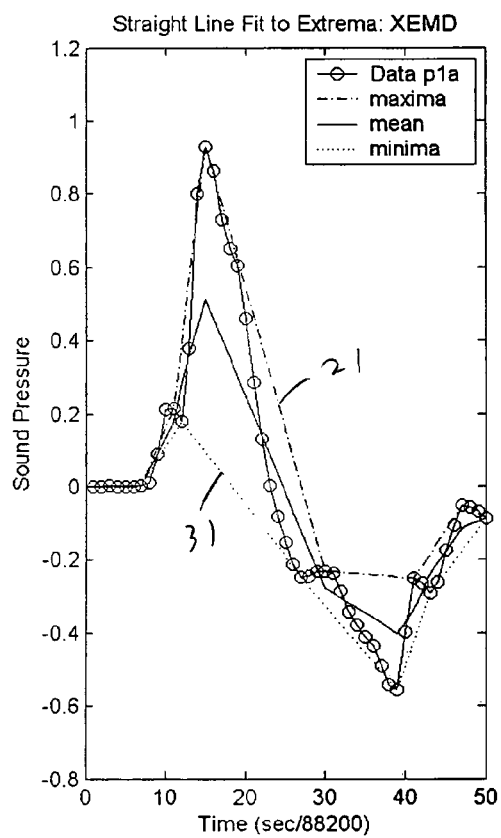
Fig 3(b)                    Fig 3(c)

COMPUTING FREQUENCY BY USING GENERALIZED ZERO-CROSSING APPLIED TO INTRINSIC MODE FUNCTIONS

ORIGIN OF INVENTION

The inventor of the invention described herein is an employee of the United States Government. Therefore, the invention may be manufactured and used by or for the Government for governmental purposes without the payment of any royalties thereon or therefor.

BACKGROUND OF THE INVENTION

The need for instantaneous frequency (IF) is a real one for data from non-stationary and nonlinear processes. If the process is non-stationary, the frequency should be ever changing, albeit at a slow rate. Then, there is a need for frequency value as a function of time, for the value will not be constant throughout. For the nonlinear cases, the frequency is definitely modulating not only among different oscillations, but also within one period. A detailed explanation of IF is disclosed in related patent application Ser. No. 10/615,365, filed on Jul. 8, 2003, entitled "Computing Instantaneous Frequency by Normalizing Hilbert Transform", inventor Norden E. Huang, which is incorporated by reference and assigned to the same assignee as this application. A computer implemented method of computing IF is disclosed in U.S. Pat. Nos. 5,983,162, 6,381,559, 6,311,130, all of which are also incorporated by reference.

The above-disclosed method of computing IF includes two essential steps and the associated presentation techniques of the results. The first step is a computer implemented Empirical Mode Decomposition to extract a collection of Intrinsic Mode Functions (IMF) from nonlinear, nonstationary signals. The decomposition is based on the direct extraction of the energy associated with various intrinsic time scales in the signal. Expressed in the IMF's, they have well-behaved Hilbert Transforms from which instantaneous frequencies can be calculated. The second step is the Hilbert Transform of the IMF. The final result is the Hilbert Spectrum. Thus, the method can localize any event on the time as well as the frequency axis. The decomposition can also be viewed as an expansion of the data in terms of the IMF's. Then, these IMF's, based on and derived from the data, can serve as the basis of that expansion. The local energy and the instantaneous frequency derived from the IMF's through the Hilbert transform give a full energy-frequency-time distribution of the data, which is designated as the Hilbert Spectrum.

However, there is a need for an alternative method to the Hilbert Transform in constructing an energy-frequency-time distribution. The Hilbert Transform is an intensive calculation process that requires powerful computers beyond many end users, including ordinary engineers and scientists, resources. Furthermore its results are not intuitive. If a signal to be analyzed has a surge-like behavior, i.e. the signal contains a very high amplitude for a short period time such as sound signal of a gunshot, the method disclosed in the above references may not generate reasonable results due to limitations imposed by spline fitting, which is used in the EMD in constructing extrema envelopes of the signal. The problem with spline fitting applied to the situation just mentioned, might result in both overshoot/undershoot problems and eventually divergence of IMF'S.

Zero Crossing points are the point where the voltage polarity of a waveform changes from negative to positive (or vice-versa) as it crosses the zero axis. In the field of signal processing, for a subject signal, the zero crossing points are detected and counted for analyzing the signal or making a decision for further actions. For example, zero crossing points are used to define bandwidth of a signal, which is assumed to be stationary and Gaussian. The bandwidth can be defined in terms of spectral moments as follows. The expected number of zero crossings per unit time is given by $$N_0 = \frac{1}{\pi}\left(\frac{m_2}{m_0}\right)^{\frac{1}{2}},$$

where the expected number of extrema per unit time is given by $$N_1 = \frac{1}{\pi}\left(\frac{m_4}{m_2}\right)^{\frac{1}{2}},$$

in which $m_i$ is the ith moment of the spectrum Therefore, the parameter, v, defined as $$N_1^2 - N_0^2 = \frac{1}{\pi^2}\frac{m_4 m_0 - m_2^2}{m_2 m_0} = \frac{1}{\pi^2}v^2,$$

offers a standard bandwidth measure. For a narrow band signal v=0, the expected numbers of extrema and zero crossings have to equal. However, the previous equation defines the bandwidth in the global sense; it is overly restrictive and lacks precision at the same time as there might be more than two extrema between two zero crossing points. Consequently, the bandwidth limitation on the Hilbert transform to give a meaningful instantaneous frequency has never been firmly established.

SUMMARY OF THE INVENTION

The present invention is directed to a computer implemented method of analyzing a physical signal. The method includes the steps of inputting the signal, extracting a set of Intrinsic Mode Functions from the signal, generating a set of mean frequency functions from the Intrinsic Mode Functions, and generating the instantaneous frequency based on critical points of the signal.

BRIEF DESCRIPTION OF THE DRAWINGS

FIG. 3(b) is a graph describing the steps of constructing upper and lower envelopes of a part of the signal of FIG. 3(a) with cubic spline fitting and generating an envelope mean from the envelopes.

FIG. 3(c) is a graph describing the steps of constructing upper and lower envelopes of a part of the signal of FIG. 3(a) with straight line fitting and generating an envelope mean from the envelopes.

DETAILED DESCRIPTION OF PREFERRED EMBODIMENT OF THE INVENTION

Figure 1A:
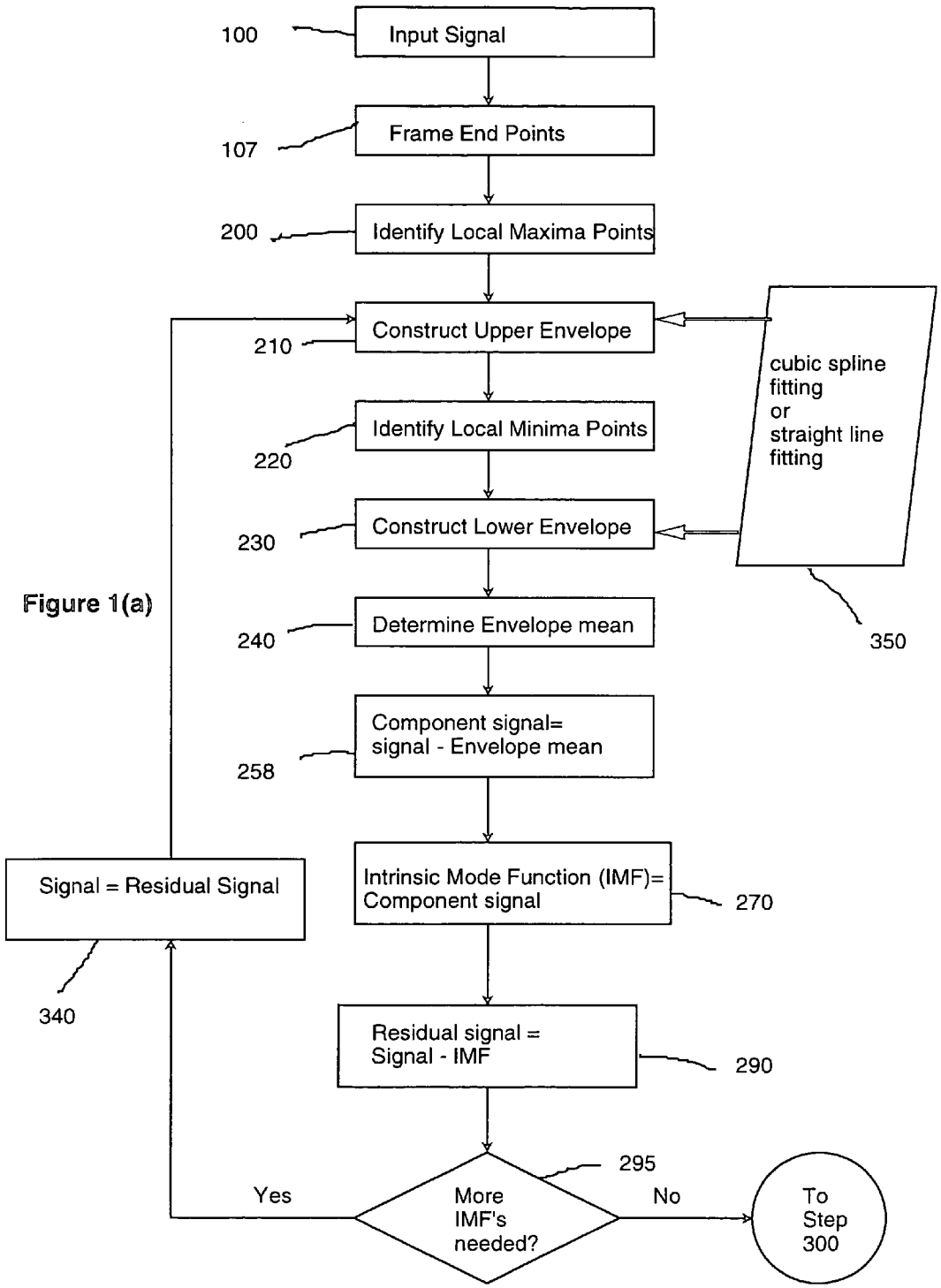
FIGS. 1(a)–(b) are high-level flowcharts describing the overall inventive method of extracting Intrinsic Mode Functions (IMFs) via Empirical Mode Decomposition (EMD) and using Generalized Zero Crossing to obtain the Instantaneous Frequency.
Figure 1B:
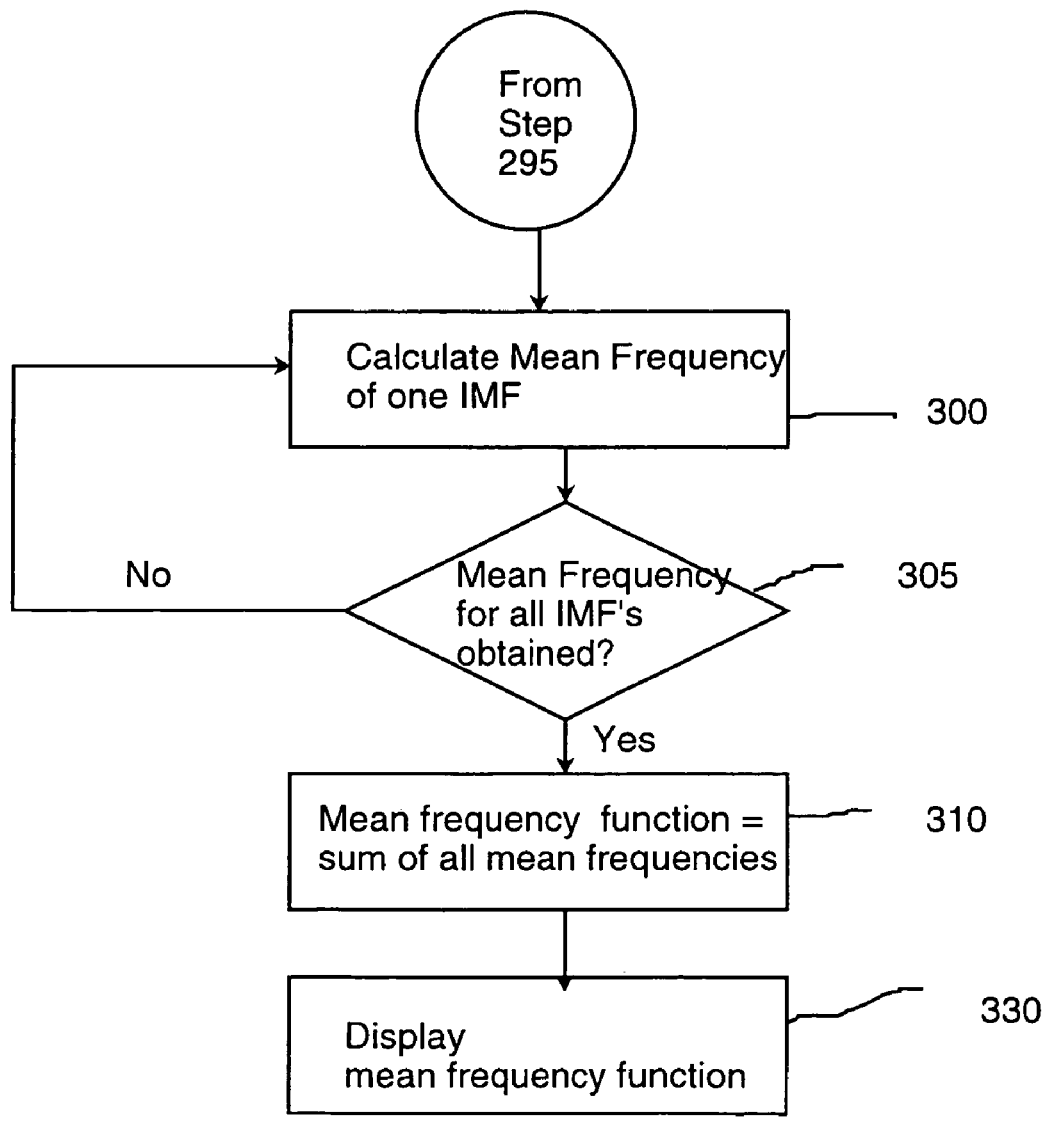

FIG. 1(a) illustrates the overall inventive method of extracting IMFs via EMD including the Sifting Process in steps 220 through 270. First, the signal can be inputted in step 100.

After inputting the signal in step 100, the analog signal is converted to the digital domain suitable for computer processing in the A/D conversion step 105. Depending upon whether the input signal is analog or digital step 105 may be bypassed. Thereafter, the Sifting Process (steps 107 through 270) is applied to Sift the signal with the Empirical Mode Decomposition method and thereby extract the intrinsic mode function(s).

The signal from step 100 is first windowed by framing the end points in step 107. Then, the Sifting Process begins at step 200 by identifying local maximum values of the digitized, framed physical signal from step 107.

Figure 2:
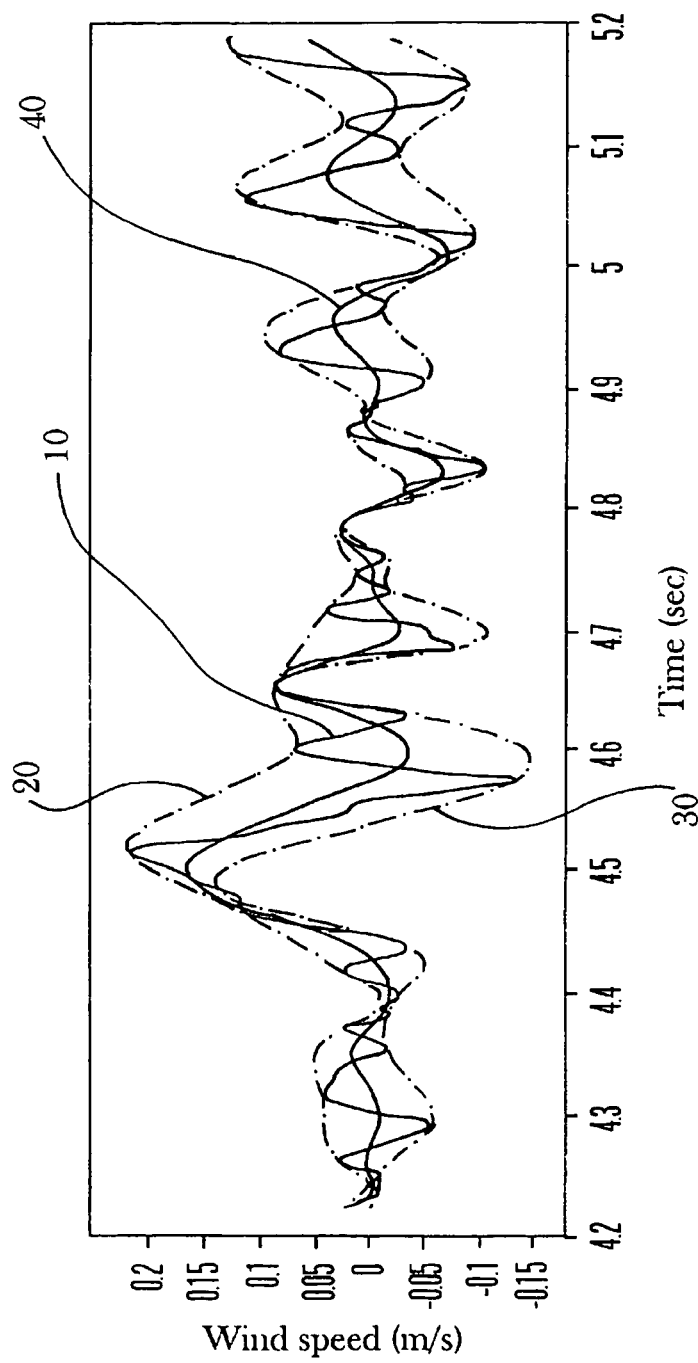
FIG. 2 is a graph illustrating an upper envelope, a lower envelope, an envelope mean and an original signal data.

Then, the method constructs an upper envelope 20 of the signal 10 in step 210. The upper envelope 20 is shown in FIG. 2 using a dot-dashed line. This upper envelope 20 is constructed with a cubic spline that is fitted to the local maxima.

Next the local minimum values of the signal 10 are identified in step 220. To complete the envelope, a lower envelope 30 is constructed from the local minimum values in step 230. The lower envelope 30 is also shown in FIG. 2 using a dot-dash line. Like the upper envelope 20, the lower envelope 30 is constructed with a cubic spline that is fitted to the local minima.

The upper and lower envelopes 20, 30 should encompass all the data within the physical signal 10. From the upper and lower envelopes 20, 30, an envelope mean 40 is the determined in step 240. The envelope mean 40 is the mean value of the upper and lower envelopes 20, 30. As can be seen in FIG. 2, the envelope mean 40 bisects the physical signal 10 quite well.

Figure 4:
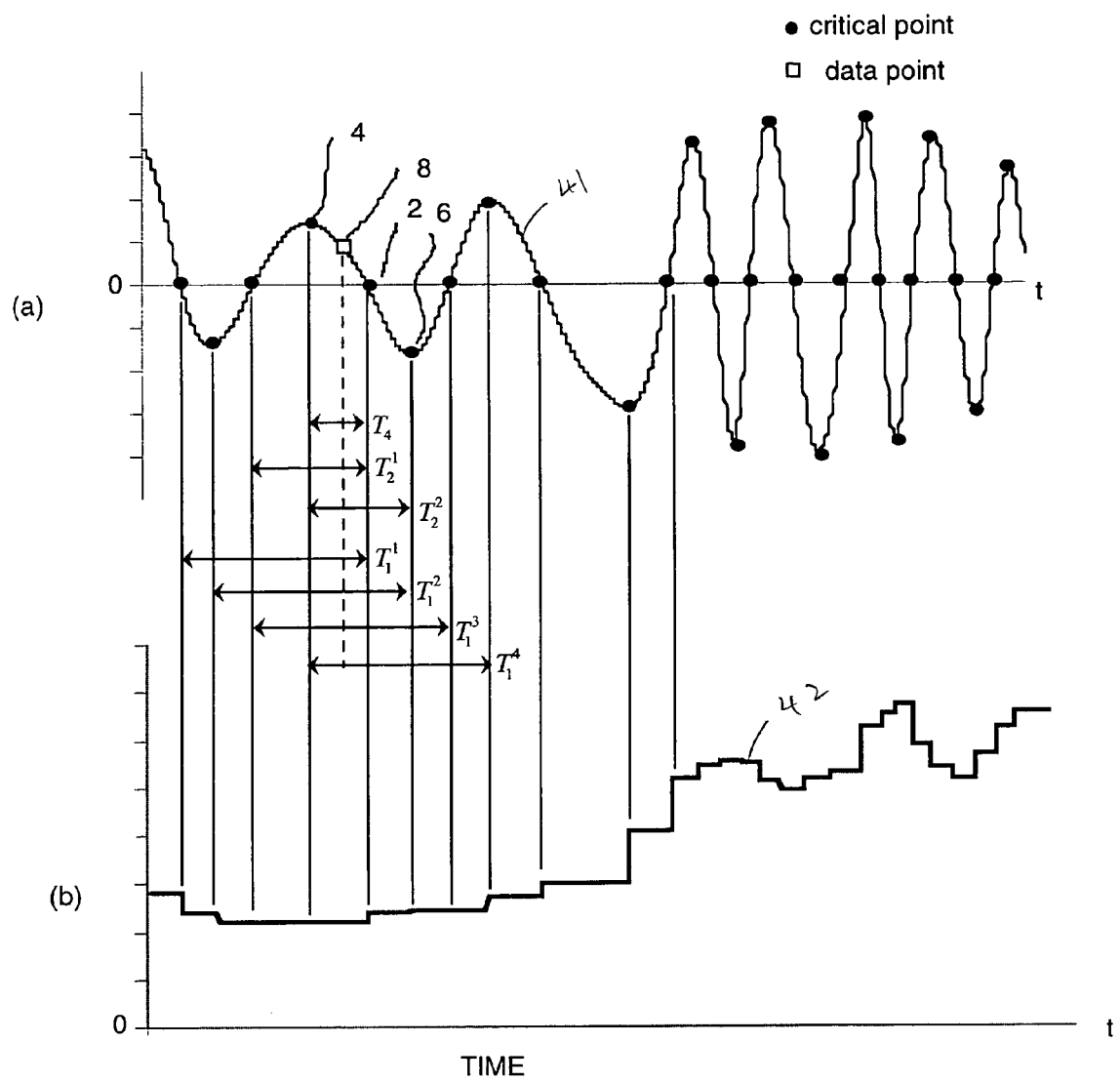
FIGS. 4(a)–(b) are graphs of data describing the Generalized Zero-Crossing approach.

Referring to steps 300 through 330, Generalized Zero-Crossing (GZC) is a method of computing the Instantaneous Frequency for a nonlinear and nonstationary signal based on full and partial periods around a data point 8 of the signal as shown in FIG. 4. Zero crossing points are points at which a signal under consideration crosses a zero value.

In the GZC approach, all zero-crossings 2 and local extrema 4, 6 are defined as critical points. As shown in the FIG. 4(a), the local extrema consist of local maxima 4 and local minima 6. For this approach, the signals to be analyzed are only meaningful Intrinsic Mode Functions (IMFs) when obtained via Empirical Mode Decomposition (EMD).

The time intervals between all the combinations of the critical points 2, 4, 6 are considered as the whole or partial wave period ($T_1^x$, $T_2^y$, and $T_4$). For example, the period between two consecutive up (or down) zero-crossings or two consecutive maxima 4 (or minima 6) can be counted as one period. Each given point along the time axis will have four different values from this class of period, designated as $T_1$. Then, the period between consecutive zero-crossings (from up to the next down zero-crossing, or from down to the next up zero-crossing), or consecutive extrema (from maximum 4 to the next minimum 6, or from minimum 6 to the next maximum 4) can be counted as a half period. Each point along the time axis will have two different values from this class of period, designated as $T_2$. Finally, the period between one kind of extrema to the next zero-crossing point, or from one kind of zero-crossings to the next extremum can be counted as a quarter period. Each point along the time axis will have one value from this class of period designated as $T_4$. Clearly, the quarter class, $T_4$, is the most local and the full wave class, $T_1$, is the least local. In total, there exist seven different period values at each point along the time axis. As $T_4$, $T_2$, and $T_1$ are weighted by factors of 4, 2 and 1, respectively, the weighted mean frequency at each point along the time axis can be computed as $$\varpi = \frac{1}{12}\left\{\frac{1}{T_4} + \left(\frac{1}{T_2^1} + \frac{1}{T_2^2}\right) + \left(\frac{1}{T_1^1} + \frac{1}{T_1^2} + \frac{1}{T_1^3} + \frac{1}{T_1^4}\right)\right\}, \quad (1)$$

wherein
  ω is mean frequency;
  $T_1^x$ are full periods (x=1, 2, 3, and 4) enclosing the point under consideration;
  $T_2^y$ are half periods (y=1 and 2) enclosing the point under consideration; and
  $T_4$ is a quarter period enclosing the point under consideration;
  An alternative is to compute a non-weighted as $$\varpi = \frac{1}{7}\left\{\frac{1}{4T_4} + \left(\frac{1}{2T_2^1} + \frac{1}{2T_2^2}\right) + \left(\frac{1}{T_1^1} + \frac{1}{T_1^2} + \frac{1}{T_1^3} + \frac{1}{T_1^4}\right)\right\}, \quad (2)$$

It is to be noted that various combinations of the critical points and weights can be used to compute the mean frequency.

Referring to step 300, a mean frequency function 42 of the signal 41 can be obtained based on a collection of the mean frequencies along the time axis as shown in FIG. 4. This process continues until all of the mean frequency functions are obtained for all of the IMFs as in steps 300 through 305. Summing up the mean frequency functions (step 310) generates a function of frequency versus time, which is the instantaneous frequency.

This approach is the most direct, local, and also the most accurate in the mean. Furthermore, this approach will also give a statistical measure of the scattering of the frequency value.

This approach provides its crude localization, only down to a quarter wavelength. This approach tends to display its inability to represent the detailed waveform distortion; it admits no harmonics. Unless the waveform contains asymmetries (either up and down, or left and right), the GZC will give it the same frequency as a sinusoidal wave. For most practical applications, this mean frequency localized down to quarter a wave period is already a well-accepted result. As this method physically measures the period, or part thereof, the values obtained can serve as the best local mean over the period to which it applies.

Figure 3A:
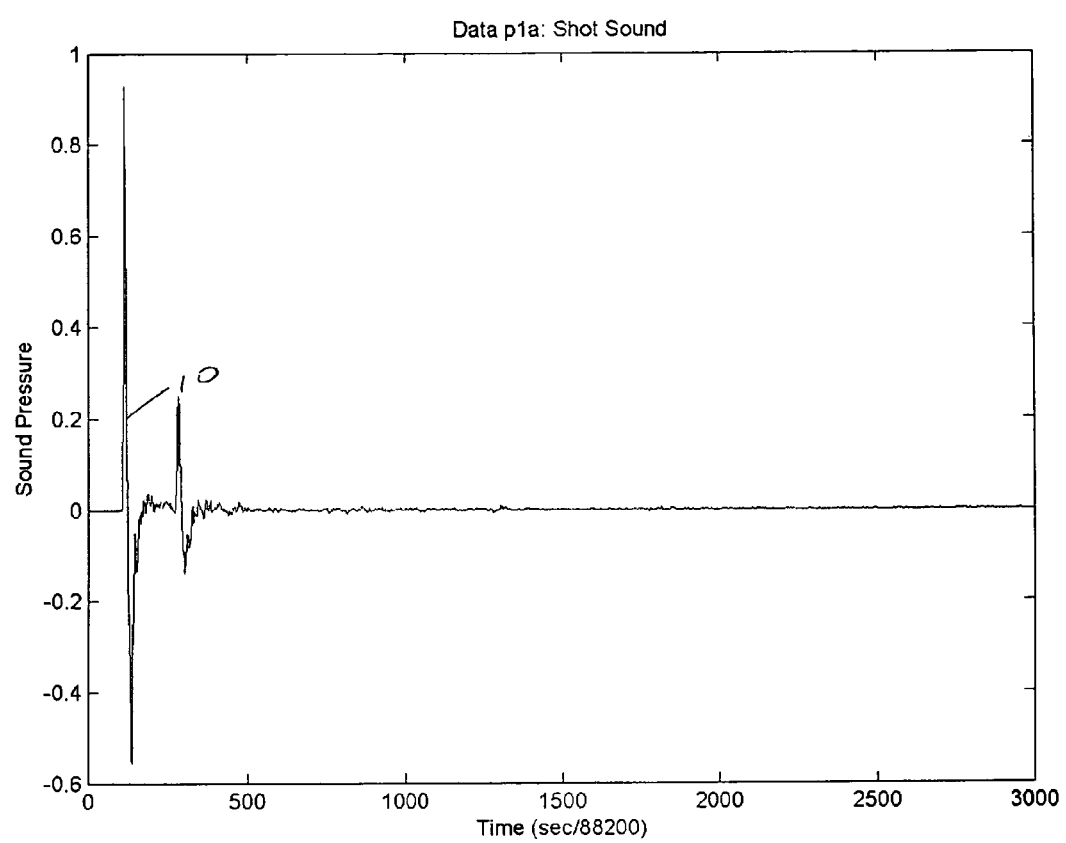
FIG. 3(a) is a graph of a sound signal of a gunshot.
Figure 3D:
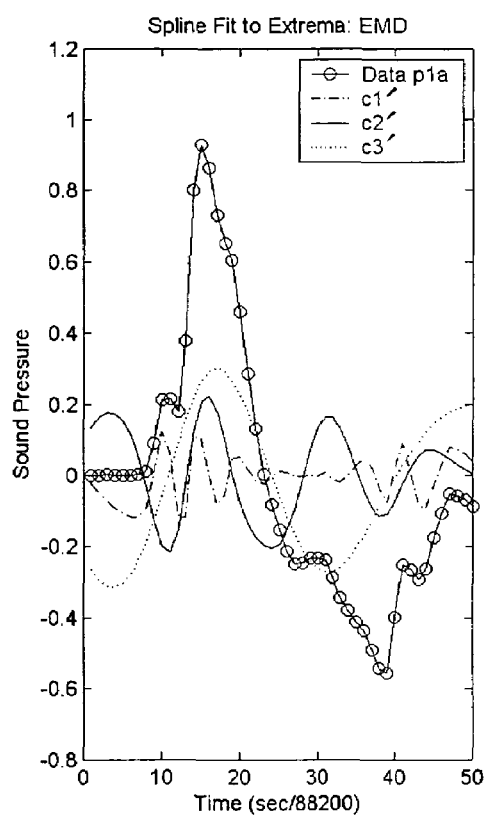
FIG. 3(d) is a graph displaying a collection of Intrinsic Mode Functions (IMFs) extracted via Empirical Mode Decomposition (EMD) with cubic spline fitting as in FIG. 3(b).
Figure 3E:
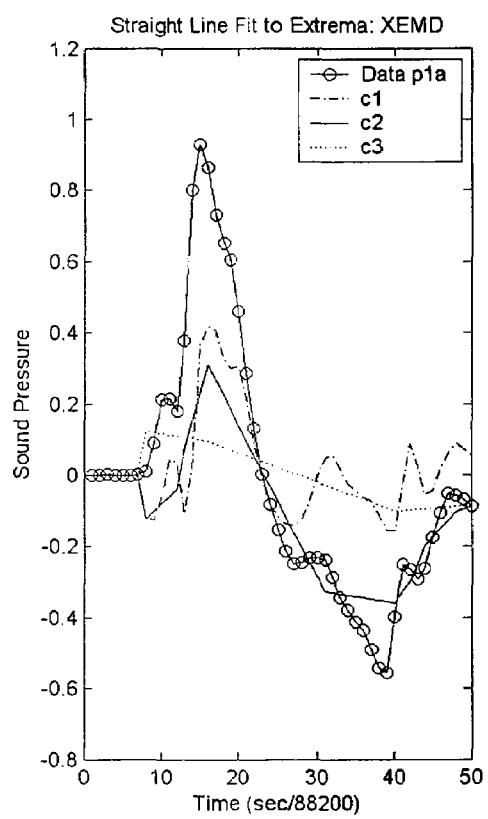
FIG. 3(e) is a graph displaying a collection of Intrinsic Mode Functions (IMF) extracted via Empirical Mode Decomposition (EMD) with straight line fitting as in FIG. 3(c).

Referring to step 350 of FIG. 1(a), serious problems of the spline fitting can occur near the ends, where the cubic spline being fitted can have large swings. The end swings, if not fixed, can eventually propagate inward and corrupt the whole data span especially in the low frequency components. For example, if the signal contains a very high amplitude for a short period time such as the sound signal of a gunshot as shown in FIG. 3(a), the method disclosed in the above references may not generate reasonable results due to extreme overshoot in the cubic spline fitting. Referring to FIG. 3(c), which deals with a problematic area of the data of FIG. 3(a), the upper and lower envelopes 21, 31 are constructed by connecting local maxima and minima with straight lines, respectively. For comparison, FIG. 3(b) shows the upper and lower envelopes 21', 31', which are constructed with the cubic spline fitting. As anticipated, the EMD based on the cubic spline fitting does not generate reasonable IMFs as shown in FIG. 3(d) whereas IMFs obtained through the straight line fitting gradually converge to a monotonically decreasing signal as shown in FIG. 3(e).

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. The computer implemented method of analyzing a physical signal from a physical device comprising the steps of;
   a. inputting the physical signal;
   b. extracting a set of Intrinsic Mode Functions from the physical signal;
   c. generating a set of mean frequency functions from the Intrinsic Mode Functions, wherein the step of generating a set of mean frequency functions includes computing the mean frequency at a point along the time scale for one of the Intrinsic Mode Functions and continuing to perform the computing step for all of the Intrinsic Mode Functions; and,
   d. displaying said set of mean frequency functions.

2. The computer implemented method as in claim 1, wherein the mean frequency at a point under consideration is a weighted mean frequency.

3. The computer implemented method as in claim 1, wherein the extracting a set of Intrinsic Mode Functions from the physical signal comprises:
   recursively sifting the physical signal via Empirical Mode Decomposition to extract an intrinsic mode function indicative of an intrinsic oscillatory mode;
   generating a residual signal by subtracting the intrinsic mode function from the physical signal;
   treating the residual signal as the physical signal during a next iteration of said recursive sifting step; and
   iterating to perform said recursive sifting to generate an n-th intrinsic mode function of an n-th intrinsic oscillatory mode until a stopping condition is met.

4. The computer implemented method of analyzing a physical signal according to claim 3, wherein said recursive sifting includes:
   identifying local maximum values in the physical signal;
   constructing an upper envelope of said physical signal from the identified local maximum values;
   identifying local minimum values in said physical signal;
   constructing a lower envelope of said physical signal from identified local minimum values;
   determining an envelope mean from the upper and lower envelopes;
   generating a component signal by subtracting the envelope mean from said physical signal;
   treating the component signal as the physical signal; and
   recursively performing said sifting until successive component signals are substantially equal.

5. The computer implemented method of analyzing a physical signal according to claim 4, wherein the step of constructing a lower envelope of the physical signal includes connecting the identified local minimum values with straight lines; and the step of constructing an upper envelope of the physical signal includes connecting the identified local maximum values with straight lines.

6. The computer implemented method of analyzing a physical signal according to claim 4, wherein the step of constructing a lower envelope of the physical signal includes connecting the identified local minimum values with cubic spline fitting; and the step of constructing a upper envelope of said physical signal includes connecting the identified local maximum values with cubic spline fitting.

7. The computer implemented method as in claim 1 further comprising: the step of summing up the mean frequency functions.

8. The computer implemented method as in claim 7 further comprising the step of:
   displaying the sum of the mean frequency functions.

9. A computer implemented method of analyzing a physical signal from a physical device comprising the steps of:
   a. inputting the physical signal;
   b. extracting a set of Intrinsic Mode Functions from the physical signal;
   c. generating an instantaneous frequency based on critical points of the signal by generating a set of mean frequency functions from the Intrinsic Mode Functions, wherein the step of generating a set of mean frequency functions includes computing the mean frequency at a point along the time scale for one of the Intrinsic Mode Functions;
   d. continuing to perform the computing step for all of the Intrinsic Mode Functions; and,
   e. displaying said instantaneous frequency.

10. The computer implemented method as in claim 9, wherein the mean frequency at a point under consideration is a weighted mean frequency.

11. The computer implemented method as in claim 9, wherein extracting a set of Intrinsic Mode Functions from the physical signal comprises:
    recursively sifting the physical signal via Empirical Mode Decomposition to extract an intrinsic mode function indicative of an intrinsic oscillatory mode;
    generating a residual signal by subtracting the intrinsic mode function from the physical signal;
    treating the residual signal as the physical signal during a next iteration of said recursive sifting step; and
    iterating to perform said recursive sifting to generate an n-th intrinsic mode function indicative of an n-th intrinsic oscillatory mode until a stopping condition is met.

12. The computer implemented method of analyzing a physical signal according to claim 11, wherein said recursive sifting including:
    identifying local maximum values in the physical signal;
    constructing an upper envelope of the signal from the identified local maximum values;
    identifying local minimum values in the physical signal;
    constructing a lower envelope of said physical signal from the identified local minimum values;

determining an envelope mean from the upper and lower envelopes;

generating a component signal by subtracting the envelope mean from said physical signal;

treating the component signal as the physical signal; and recursively performing said sifting until successive component signals are substantially equal.

13. The computer implemented method or analyzing a physical signal according to claim 12, wherein the step of constructing a lower envelope of the physical signal includes connecting the identified local minimum values with straight lines; and the step of constructing an upper envelope of the physical signal includes connecting the identified local maximum values with straight lines.

14. The computer implemented method of analyzing a physical signal according to claim 12, wherein the step of constructing a lower envelope of the physical signal includes connecting the identified local minimum values with cubic spline fitting; and the step of constructing a upper envelope of said physical signal includes connecting the identified local maximum values with cubic spline fitting.

\* \* \* \* \*